United States Patent
Walsh (10) Patent No.: US 10,934,068 B2
(45) Date of Patent: Mar. 2, 2021

(54) VENTING LINER AND METHOD

(71) Applicant: DeWal Industries, LLC, Saunderstown, RI (US)

(72) Inventor: Edward D Walsh, East Greenwich, RI (US)

(73) Assignee: DEWAL INDUSTRIES, LLC, Saunderstown, RI (US)

( * ) Notice: Subject to any disclaimer, the term of this patent is extended or adjusted under 35 U.S.C. 154(b) by 555 days.

(21) Appl. No.: 15/652,375

(22) Filed: Jul. 18, 2017

(65) Prior Publication Data

US 2017/0313483 A1  Nov. 2, 2017

Related U.S. Application Data (62) Division of application No. 12/402,402, filed on Mar. 11, 2009, now Pat. No. 9,708,110.

(Continued)

(51) Int. Cl.
    *B65D 53/04*    (2006.01)
    *B65D 51/16*    (2006.01)
    (Continued)

(52) U.S. Cl.
    CPC ........... *B65D 53/04* (2013.01); *B31D 1/0018* (2013.01); *B65D 51/1616* (2013.01); *B32B 38/0004* (2013.01)

(58) Field of Classification Search
    CPC .. B65D 53/04; B65D 51/1616; B32B 38/0004
    See application file for complete search history.

(56) References Cited

U.S. PATENT DOCUMENTS

2,602,559 A  7/1952 Dryer
3,071,276 A  1/1963 Pellett et al.
(Continued)

FOREIGN PATENT DOCUMENTS

EP  1095764 A2  5/2001
EP  1095764 A3  9/2002
(Continued)

OTHER PUBLICATIONS

International Preliminary Report on Patentability for International Application No. PCT/US2009/035927.
(Continued)

*Primary Examiner* — Mark A Osele
*Assistant Examiner* — Christopher C Caillouet
(74) *Attorney, Agent, or Firm* — Cantor Colburn LLP (57) ABSTRACT

A venting liner is connectable in fluid communication between a closure and an interior of a device for venting gas from the interior into the ambient atmosphere. The venting liner has a first fluid impervious and gas permeable outer layer, a second relatively rigid and substantially incompressible outer layer defining an open cell structure, and an inner foam layer defining an inner surface and an outer surface, a plurality of fluid-flow apertures spaced relative to each other, extending between the inner and outer surfaces, and forming substantially vertical fluid-flow paths through the inner layer. The first outer layer is in fluid communication with the interior of the device for venting gas through the interior of the first outer layer, substantially vertically through the apertures and, in turn, through the interior open cell structure of the second outer layer and into the ambient atmosphere.

19 Claims, 5 Drawing Sheets

Related U.S. Application Data (60) Provisional application No. 61/035,891, filed on Mar. 12, 2008.

(51) Int. Cl.
  *B31D 1/00* (2017.01)
  *B32B 38/00* (2006.01)

(56) References Cited

U.S. PATENT DOCUMENTS

| | | | |
|---|---|---|---|
| 3,263,850 A | 8/1966 | Scott | |
| 3,315,831 A | 4/1967 | Scott | |
| 3,318,836 A | 5/1967 | Cubitt | |
| 3,319,836 A | 5/1967 | Cubitt | |
| 3,326,401 A | 6/1967 | De Long | |
| 3,448,882 A | 6/1969 | Roy | |
| 3,466,444 A | 9/1969 | Lusk | |
| 3,471,051 A | 10/1969 | Cistone | |
| 3,521,784 A | 7/1970 | Gaines et al. | |
| 3,557,989 A | 1/1971 | Balda | |
| 3,866,845 A * | 2/1975 | Keeler | B65D 41/045 215/341 |
| 3,951,293 A | 4/1976 | Schultz | |
| 3,971,489 A | 7/1976 | Welch et al. | |
| 3,976,217 A | 8/1976 | Dukess | |
| 4,044,994 A | 8/1977 | Priese | |
| 4,121,728 A | 10/1978 | Tagalakis et al. | |
| 4,175,671 A | 11/1979 | Holl et al. | |
| 4,457,440 A | 7/1984 | Dukess | |
| 4,596,338 A | 6/1986 | Yousif | |
| 4,765,499 A | 8/1988 | Von Reis et al. | |
| 4,789,074 A | 12/1988 | Han | |
| 4,884,716 A | 10/1989 | Steiner | |
| 4,935,273 A | 6/1990 | Ou-Yang | |
| 5,289,932 A | 3/1994 | Dimeo et al. | |
| 5,531,341 A | 7/1996 | Shlisky | |
| 5,579,936 A | 12/1996 | Costa et al. | |
| 5,598,940 A | 2/1997 | Finkelstein et al. | |
| 5,615,789 A | 4/1997 | Finkelstein et al. | |
| 5,692,634 A | 12/1997 | Jenkins et al. | |
| 5,730,306 A | 3/1998 | Costa et al. | |
| 5,853,096 A | 12/1998 | Bartur et al. | |
| 5,964,465 A | 10/1999 | Mills et al. | |
| 6,095,356 A | 8/2000 | Rits | |
| 6,196,409 B1 | 3/2001 | Lake et al. | |
| 6,257,455 B1 | 7/2001 | Trepina et al. | |
| 6,312,776 B1 | 11/2001 | Finkelstein et al. | |
| 6,399,696 B1 | 6/2002 | Toyosawa et al. | |
| 6,602,309 B2 | 8/2003 | Vizulis et al. | |
| 6,714,772 B2 | 4/2004 | Micciche et al. | |
| 6,983,857 B2 | 1/2006 | Miller et al. | |
| 7,255,354 B2 | 8/2007 | Tamura et al. | |
| 7,461,754 B2 | 12/2008 | Walsh | |
| 7,648,764 B2 | 1/2010 | Yousif | |
| 7,784,630 B2 | 8/2010 | Walsh | |
| 8,220,649 B2 | 7/2012 | Walsh | |
| 9,708,110 B2 | 7/2017 | Walsh | |
| 2001/0047977 A1 | 12/2001 | Forman | |
| 2003/0196418 A1 | 10/2003 | O'Brien et al. | |
| 2005/0248097 A1 | 11/2005 | Walsh | |
| 2009/0200308 A1 | 8/2009 | Walsh | |
| 2009/0230078 A1 | 9/2009 | Walsh | |
| 2009/0230079 A1 | 9/2009 | Smolko | |

FOREIGN PATENT DOCUMENTS

| | | |
|---|---|---|
| JP | 62-125751 U | 8/1987 |
| JP | 2003-026222 A | 1/2003 |
| JP | 2006-232340 A | 9/2006 |
| JP | 2007-116059 A | 5/2007 |

OTHER PUBLICATIONS

Tri-Seal Technical Data Sheet F- 217-3, Available at www.tri-seal.com.
International Search Report and Written Opinion dated Nov. 10, 2009, for PCT/US2009/036893.
International Search Report and Written Opinion dated Apr. 20, 2009, for PCT/US2009/003452.

* cited by examiner

VENTING LINER AND METHOD

CROSS-REFERENCE TO RELATED APPLICATIONS

This application is a divisional application of co-pending U.S. patent application Ser. No. 12/402,402, filed on Mar. 11, 2009, claiming benefit under 35 U.S.C. § 119 to U.S. Provisional Patent Application No. 61/035,891 filed Mar. 12, 2008, which are hereby incorporated by reference in their entirety as part of the present disclosure as if fully set forth herein.

FIELD OF THE INVENTION

The present invention relates to venting liners and methods of making and using venting liners, and more particularly, to venting liners that are connectable in fluid communication between a closure and an interior of a device for venting gases therethrough and to related methods of making and using such venting liners.

BACKGROUND OF THE INVENTION

Containers are often used to retain or store various temperature and/or pressure sensitive substances, such as aqueous solutions, peroxides, chlorines, alcohols, aromatics, ketones, and other chemically active substances. Containers storing substances that are subject to changes in pressure, temperature, altitude and other factors affecting packaging conditions require venting to avoid the negative effects that can result from retaining such sensitive substances in a container. Failure to adequately seal the liquids within the container could result in leakage. Failure to adequately vent the container may result in a pressure differential between the inside of the container and the outside of the container, which in turn may cause the container to collapse, swell or explode.

Various venting arrangements have been developed in an effort to reduce or eliminate the negative effects associated with poorly vented containers. For example, it is known to utilize a polytetrafluoroethylene (PTFE) liner or an expanded polytetrafluoroethylene (ePTFE) liner to vent a container. PTFE and ePTFE liners have a microporous structure that repels liquids while safely allowing for the free passage of gas, thus enabling their use in venting liners. These liners typically cooperate with a venting aperture located in a cap above the liner or have a number of grooves in the upper surface of the liner that cooperate with the threads of a cap to vent the container.

It is also known to combine a bottom layer of liquid-impermeable and gas-porous material with a top layer of elastomeric material, wherein the top layer defines a plurality of apertures extending through it in fluid communication with grooves furrowed into the upper surface of the top layer. When in cooperation with a container closure, the gas is vented through the apertures and then out through the grooves. An exemplary such liner is shown in U.S. Pat. No. 5,730,306.

It is known to place such prior art venting liners between a container and a closure, whereby the venting liner is supported solely by the land of the container neck, or by a combination of a land of the container neck and a cross-bar extending across the opening of the container.

One drawback associated with such prior art venting liners is that they can exhibit limited venting capacity due to constraints in the sizes of the venting apertures and/or grooves. Yet another drawback is that such venting liners can be more expensive than desired. Another drawback associated with such prior art venting liners is that, when the container closure is subject to a relatively high torque and the venting liner is subsequently subject to relatively high compressive forces, the compressible material of the venting liner can compress to a degree sufficient to exhibit a lower venting capacity than otherwise desired.

Prior art venting liners also are susceptible to undesirable deformation when subject to relatively high torque and/or compressive forces from closures due to uneven support surfaces of the container. Such unevenly-supported liners do not have sufficient rigidity to resist undesirable deformation when subjected to relatively high closure forces. Prior art venting liners have been known to wrinkle or tear, resulting in reduced efficiency and/or failure of the liner.

Accordingly, it is an object of the present invention to overcome one or more of the above-described drawbacks and/or disadvantages of the prior art.

SUMMARY OF THE INVENTION

In accordance with a first aspect, the present invention is directed to a venting liner connectable in fluid communication between a closure and an interior of a device for venting gas from the interior into an ambient atmosphere. The venting liner comprises a first substantially liquid impermeable and gas permeable outer layer in fluid communication with the interior of the device for allowing the flow of gas but preventing the flow of liquid therethrough. A second outer layer of the venting liner defines a plurality of fluid flow paths therethrough, and is substantially incompressible in response to the application of a closure force applied by the closure thereto. The venting liner further includes a compressible inner layer that is compressible in response to the application of a closure force applied by the closure thereto, and defines a plurality of inner fluid flow paths in fluid communication between the first outer layer and the second outer layer. The venting liner allows the venting of gas from the interior of the device, through the first outer layer, through the compressible inner layer and, in turn, through the second outer layer and into the ambient atmosphere.

In some embodiments of the present invention, the inner layer defines an inner surface and an outer surface, a plurality of fluid-flow apertures spaced relative to each other, extending between the inner and outer surfaces, and forming substantially vertical fluid-flow paths through the inner layer. In some such embodiments, the inner layer is a foam layer. In some such embodiments, the foam layer includes a plurality of layers. In some such embodiments, the foam layer includes an inner foam layer and opposing outer substantially solid layers.

In some embodiments of the present invention, the second outer layer is relatively rigid in comparison to the inner layer and first outer layer, and defines an open cell structure in fluid communication with at least a plurality of the fluid-flow apertures of the inner layer. In some embodiments of the present invention, the second outer layer is UHMW polyethylene. In some embodiments of the present invention, the first outer layer is PTFE and/or ePTFE. In some embodiments of the present invention, the first outer layer defines a thickness within the range of about 0.002 inch to about 0.004 inch, the second outer layer defines a thickness within the range of about 0.003 inch to about 0.05 inch, and the inner layer defines a thickness within the range of about 0.002 inch to about 0.008 inch.

In accordance with another aspect, the present invention is directed to a venting liner connectable in fluid communication between a closure and an interior of a device for forming a fluid-tight seal upon application of a closure force thereto and for venting gas from the interior into an ambient atmosphere. The venting liner comprises first means in fluid communication with the interior of the device for allowing the flow of gas but preventing the flow of liquid therethrough. Second means of the venting liner are provided for substantially resiliently compressing itself in response to application of the closure force applied by the closure thereto, and is in fluid communication with the first means for venting gas received from the first means substantially vertically therethrough. The venting liner includes third means for supporting the first and second means, for substantially preventing compression of itself in response to application of the closure force thereto, and in fluid communication with the second means for venting gas received from the second means therethrough.

In some embodiments of the present invention, the first means is a first outer layer defining a plurality of pores that allow the flow of gas but prevent the flow of liquid therethrough, the second means is a foam inner layer defining a plurality of flow paths therethrough, and the third means is a substantially incompressible outer layer defining a plurality of flow paths therethrough.

In accordance with another aspect, the present invention is directed to a method comprising the following steps:

(i) providing a first substantially liquid impermeable and gas permeable outer layer;
(ii) providing a compressible inner layer;
(iii) providing a second substantially incompressible outer layer;
(iv) perforating the inner layer at a plurality of locations spaced relative to each other and, in turn, forming a plurality of fluid-flow apertures through the inner layer; and
(v) laminating the inner layer between the first and second outer layers and, in turn, forming a venting liner that vents gas through the first outer layer, through the fluid flow apertures of the inner layer and, in turn, through the second outer layer.

In some embodiments of the present invention, the laminating step comprises the application of at least one of heat and pressure. In some such embodiments, the laminating step comprises moving the first outer layer, the second outer layer and the inner layer between a first rotatably mounted roller and a second rotatably mounted roller spaced therefrom.

Some embodiments further comprise the steps of connecting the venting liner in fluid communication between a device and a closure; substantially preventing the flow of liquid through the first outer layer, and allowing the flow of gas from the interior of the device, through the interior of the first outer layer, into at least a plurality of the fluid-flow apertures, through the interior of the second outer layer, and into the ambient atmosphere.

In accordance with another aspect, the present invention is directed to a method comprising the steps of:

(i) providing a device with an opening;
(ii) providing a closure for the device;
(iii) providing a venting liner comprising a first substantially liquid impermeable and gas permeable outer layer, a compressible inner layer, and a second relatively rigid and substantially incompressible outer layer;
(iv) locating the venting liner between the closure and the device;
(v) engaging the closure with the device such that the outer layer of the venting liner is engageable with a surface extending about the opening of the device;
(vi) applying a closure force with the closure to the second outer layer of the venting liner;
(vii) supporting the inner layer with the second outer layer, and substantially preventing compression of the second outer layer and compressing the inner layer in response to application of the closure force thereto;
(viii) preventing the flow of liquid from the interior of the device through the first outer layer; and
(ix) venting gas from the interior of the device through the first outer layer, substantially vertically through the inner layer, and in turn through the second outer layer and into the ambient atmosphere.

In some embodiments of the present invention, the supporting step includes relatively rigidly supporting the inner layer with the second outer layer, and distributing the closure force applied to the second outer layer substantially throughout an interface between the venting liner and device.

One advantage of the present invention is that the second outer layer provides rigidity to the liner, ensuring that the liner does not deform or tear in high-torque applications and that the fluid flow apertures subsequently remain open. Another advantage of the present invention is that the second outer layer is substantially incompressible, thus eliminating the need for venting grooves or apertures in the second outer layer. Another advantage of some currently preferred embodiments of the present invention is that the substantially incompressible second outer layer vents horizontally therethrough when engaged with a closure of a device. Another advantage of some currently preferred embodiments is that the venting capacity can be adjusted by adjusting the size and/or number of the substantially vertical fluid-flow apertures in the inner layer. Another advantage of some currently preferred embodiments is that the liner can be manufactured relatively cost effectively.

Other objects and advantages of the present invention and/or of the currently preferred embodiments thereof will become more readily apparent in view of the following detailed description of the currently preferred embodiments and accompanying drawings.

DETAILED DESCRIPTION OF EMBODIMENTS OF THE INVENTION

Figure 1:
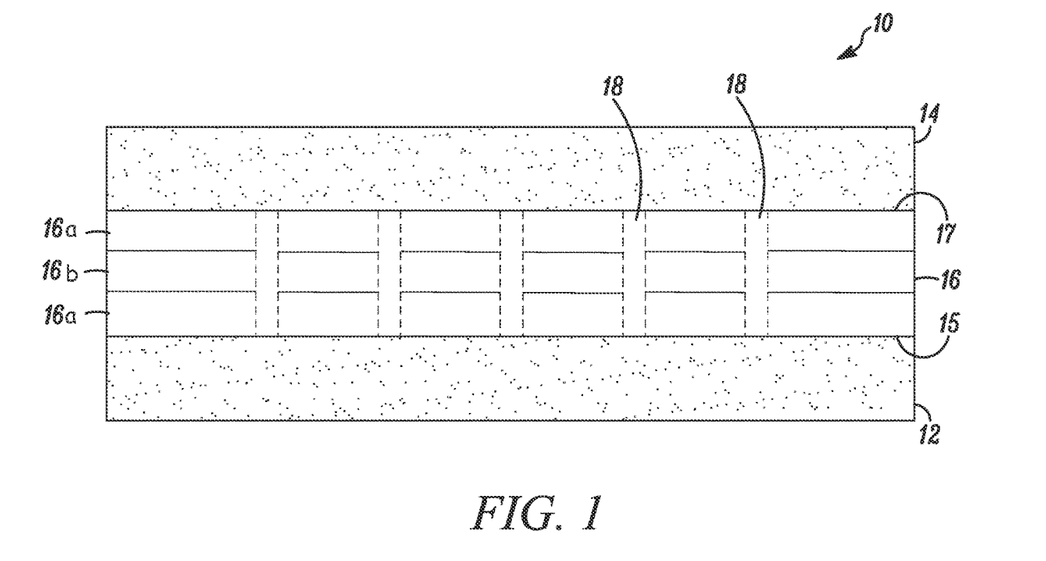
FIG. 1 is a cross-sectional view of a venting liner embodying the present invention.

Referring to the drawings, and in particular to FIG. 1, a venting liner in accordance with an illustrative embodiment of the present invention is indicated generally by the reference numeral 10. The venting liner 10 comprises a first outer layer 12 and a second outer layer 14. The venting liner further comprises an inner layer 16 defining an inner surface 15 and an outer surface 17. The first outer layer 12 is laminated to the inner surface 15 of the inner liner 16. The second outer layer 14 is laminated to the outer surface 17 of the inner liner 16. The term "venting liner" is used herein to mean a liner or other device for venting a container or any other device that may require venting, wherein the liner may, if desired, provide a seal for sealing, for example, a closure to the container or other device.

The inner layer 16 defines a plurality of fluid-flow apertures 18 extending between the inner surface 15 and the outer surface 17 and forming a plurality of substantially vertical fluid-flow paths extending through the layer. The terms "substantially vertical" or "substantially vertical fluid flow" are used herein to mean fluid flow that is vertical, almost vertical or generally upwardly directed. As described further below, the fluid-flow apertures 18 define substantially vertical fluid-flow paths for venting gas therethrough, and the apertures cooperate with the first outer layer 12 and the second outer layer 14 to vent gas into the ambient atmosphere. The first outer layer 12 is a porous layer that is substantially liquid impervious and gas permeable. Thus, the first outer layer 12 does not permit the passage of liquid, but does permit the passage of gas through the first outer layer 12 and into the apertures 18 of the inner layer 16. The second outer layer 14 is a porous and substantially rigid layer. Accordingly, as described further below, gas is permitted to vent from a container through the first inner layer 16, through the apertures 18 of the first inner layer 16 and, in turn, through the relatively rigid second outer layer 14 and into the ambient atmosphere.

Figure 2:
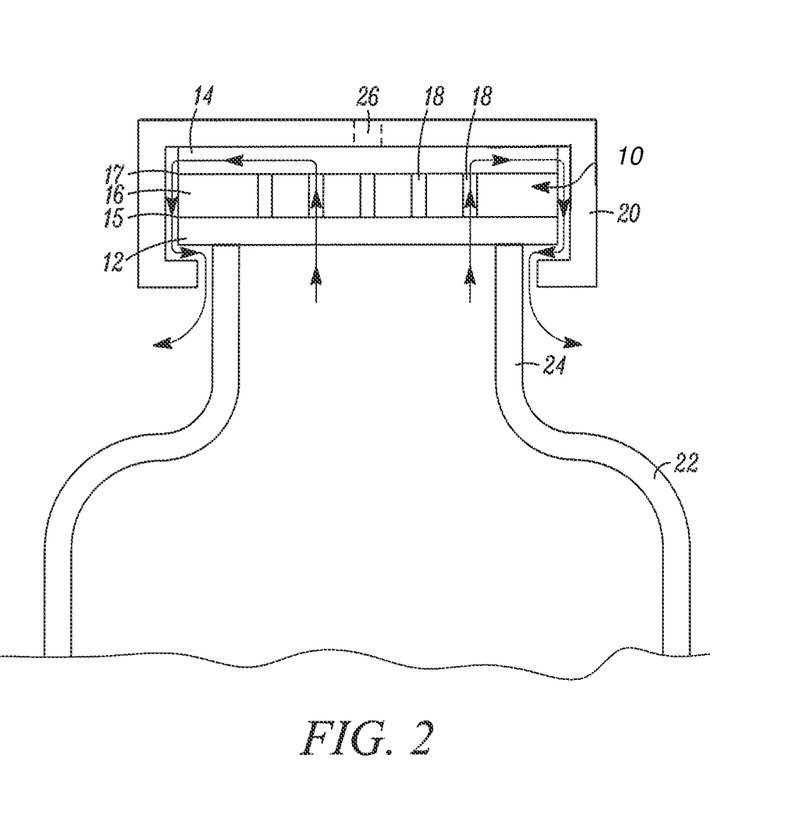
FIG. 2 is a somewhat schematic, cross-sectional view of the venting liner of FIG. 1 seated between a container neck and closure for venting gases from the interior of the container into the ambient atmosphere.
Figure 3:
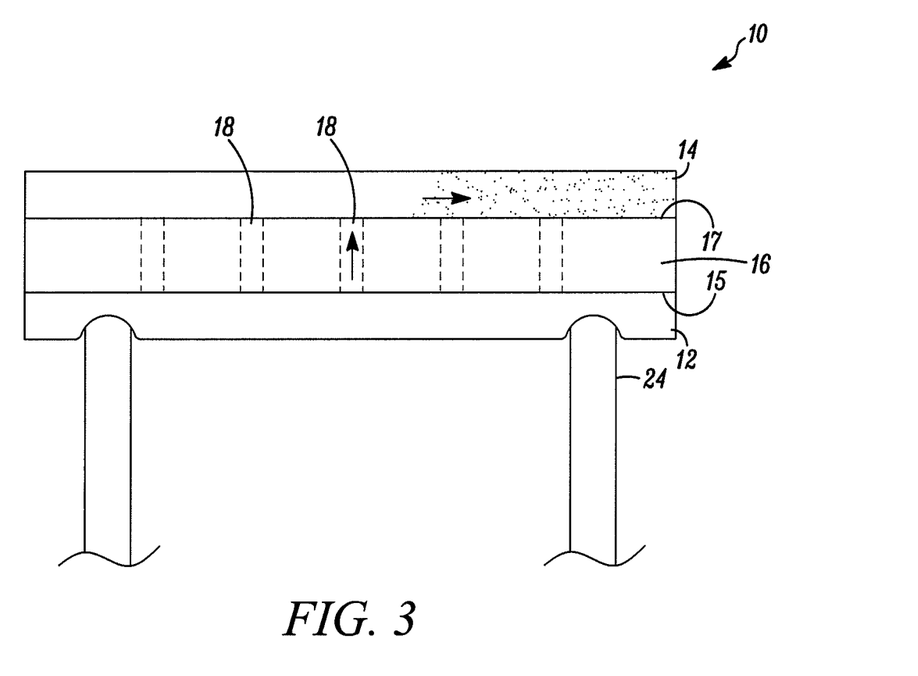
FIG. 3 is a somewhat schematic, cross-sectional view of the venting liner of FIG. 1 seated on the land of a container neck.

Turning to FIG. 2, the venting liner 10 is engageable with an exemplary closure 20 such that the first outer layer 12 forms liquid-tight seal between the neck of an exemplary container body 22 and the closure 20. When the closure 20 is secured to the container body 22, the venting liner 10 is compressed between the land 24 on the neck of the container body 22 and the closure 20. This compression deforms the first outer layer 12 and the inner layer 16 and thereby forms a liquid-tight seal between the container body and closure, as shown in FIG. 3. Accordingly, as indicated by the exemplary arrows in FIG. 2, gas from the interior of the container body 22 is permitted to vent substantially vertically through the gas-permeable first outer layer 12, through the fluid-flow apertures 18 of the inner layer 16, through the second outer layer 14, and through, for example, venting passages formed or otherwise defined by the threads between the closure and body and into the ambient atmosphere. In the illustrated embodiment, an internal surface of the closure 20 engages the outer surface of the second outer layer 14. As such, in the illustrated embodiment, the gas flows substantially horizontally through the second outer layer 14 and flows from the second outer layer 14 downwardly into a fluid-flow path defined by the threaded connection between the closure 20 and the neck of the container body 22. As described further below, in the illustrated embodiment, the second outer layer 14 defines substantially throughout the layer an open cell structure that allows gas to vent through it. Accordingly, if permitted, the gas can flow throughout the second outer layer substantially horizontally and/or vertically. The terms "substantially horizontally" or "substantially horizontal fluid flow" are used herein to mean fluid flow that is horizontal, almost horizontal, or generally laterally directed.

As may be recognized by those of ordinary skill in the pertinent art based on the teachings herein, the closure and container or other device may take any of numerous different configurations that are currently known, or that later become known, and the venting arrangement of the closure and/or device may take any of numerous different configurations that are currently known, or that later become known. For example, as illustrated in broken lines in FIG. 2, the closure 20 may include one or more venting apertures 26 formed in an upper wall thereof such that the gas may flow substantially vertically and/or substantially horizontally through the outer layer 14 and, in turn, out through venting aperture(s) 26. The venting liner can also be used with a cap or closure forming a gap between the closure and the venting liner 10 such that gas flows substantially vertically and/or substantially horizontally through the second outer layer 14 and into the ambient atmosphere.

The venting liner 10 can be designed and/or adjusted to accommodate any of a variety of different application requirements, including without limitation cap liners, closures (e.g., wherein the liner is used to seal a closure to a container or other device, and may be a separate element or may be formed integral with the closure, container and/or other device), and battery applications, and can be used to seal within a container or other device any of a variety of liquids and to vent any of a variety of gases.

As may be recognized by those of ordinary skill in the pertinent art based on the teachings herein, the inner layer 16 may be formed from any of a variety of materials that are currently known, or that later become known for performing the function of the inner layer 16, including any of a variety of chemically resilient and/or temperature resistant materials. The inner layer 16 can be woven, non-woven or otherwise formed from various types of fibrous or non-fibrous materials. The inner layer 16 is preferably easily handled during manufacture, may be cut or shaped to fit any of a variety of geometries, and may be formed into films as thin as about 0.002 inch. The inner layer 16 preferably may be converted from hydrophobic to hydrophilic and vice versa. The inner layer 16 also may be either oleophilic or oleophobic. Similarly, the inner layer 16 may be treated to repel the passage therethrough of at least one of a solvent or a petroleum-based substance. The inner layer 16 preferably may be bonded to nearly any material, including, for example, polypropylene materials, polyethylene materials, polyester materials, Kevlar®, glass fabrics, and a variety of other materials. In some embodiments, the inner layer 16 defines a thickness within the range of about 0.001 inch to about 0.01 inch, preferably within the range of about 0.003 inch to about 0.009 inch, and most preferably within the range of about 0.002 inch to about 0.008 inch, and in one such embodiment, a thickness of about 0.005 inch. In one embodiment of the present invention, the inner layer 16 is a perforated, multiple layer or ply material including an inner foam layer 16b and opposing outer layer substantially solid layers 16a. In some such embodiments, the inner foam layer is a low density polyethylene foam, and the opposing outer layers are substantially solid low density polyethylene layers, wherein the three layers are co-extruded or otherwise laminated to each other. Some such materials are sold under the designations F-217-3 and F-217 by Tri-Seal Company, having an address at 900 Bradley Hill Road, Blauvelt, N.Y. 10913, U.S.A. As may be recognized by those of ordinary skill in the pertinent art based on the teachings herein, these materials are only exemplary, and numerous other materials that are currently known, or that later become known, equally may be employed to form the inner layer 16. For example, in other embodiments of the present invention, the inner layer 16 is not a foam layer, but rather is made of another plastic material, such as a solid or substantially solid polyethylene or polypropylene, a silicon material, such as a silicone rubber, a resilient thermoplastic material, such as a thermoplastic elastomer, or another elastomeric material. In other embodiments of the present invention, the foam inner layer includes more or less layers than the three-layer material described herein.

As discussed in more detail below, in some embodiments, the fluid flow apertures 18 extending through the inner layer 16 may be adjusted as desired to accommodate a variety of application requirements. For example, the fluid flow apertures 18 may be laterally spaced substantially equidistant relative to one another or, alternately, they may be unevenly or randomly distributed about the inner layer 16. Likewise, the size(s) and/or number of fluid flow apertures 18 may be altered to control or otherwise effect the fluid flow through inner layer 16.

As may be recognized by those of ordinary skill in the pertinent art based on the teachings herein, the first outer layer 12 may be formed from any of a variety of materials that are currently known, or that later become known for performing the function of the inner layer, including any of a variety of chemically resilient and/or temperature resistant materials. The first outer layer 12 may be woven, non-woven or otherwise formed from various types of fibrous or non-fibrous materials. In some embodiments of the present invention, the first outer layer 12 is formed from a low density extruded, unsintered and highly porous material, such as a polytetrafluoroethylene (PTFE), an expanded PTFE (ePTFE), or variations or modifications of either of the foregoing materials. In some such embodiments, the PTFE or ePTFE first outer layer 12 defines a thickness within the range of about 0.0005 inch to about 0.01 inch, and preferably within the range of about 0.002 inch to about 0.004 inch, and in one such embodiment, a thickness of about 0.003 inch. The first outer layer 12 is preferably hydrophobic or liquid impermeable, easily handled during manufacture, and preferably may be cut or shaped to fit any of a variety of geometries. The first outer layer 12 is preferably usable over a broad temperature range, from as high as about 260° C. to as low as about −268° C. In some embodiments of the present invention, the pore size distribution of the first outer layer 12 is within the range of about 0.05 microns to about 5 microns. In one such embodiment, a PTFE or ePTFE first outer layer defines a porosity within the range of about 25% to about 95% open area (by volume), and preferably within the range of about 50% to about 90% open area (by volume). In one embodiment, a PTFE or ePTFE first outer layer defines a porosity of about 80% open area (by volume). If desired, the first outer layer 12 may be converted from the preferred hydrophobic form to a hydrophilic form. The first outer layer 12 also may be either oleophilic or oleophobic. Similarly, the first outer layer 12 may be treated to repel the passage therethrough of at least one of a solvent or a petroleum-based substance.

In the embodiment illustrated in FIG. 3, the first outer layer 12 is compressible, and therefore forms a fluid-tight seal against the surfaces with which it is compressed, such as the device opening surfaces. The inner foam layer 16, on the other hand, is more resilient than the first outer layer 12 to facilitate forming a fluid-tight seal. The first outer layer 12 will typically take on a set or will tend not to go back to its original shape after being compressed. Thus, the first outer layer 12 facilitates in forming a fluid-tight seal between the liner 10 and the land 24, as illustrated in FIG. 3. The inner layer 16 facilitates in maintaining that seal during storage and/or shelf life, and/or after a closure is removed and resealed to the container or other device.

As may be recognized by those of ordinary skill in the pertinent art based on the teachings herein, the second outer layer 14 may be formed from any of a variety of materials that are currently known, or that later become known for performing the function of the second outer layer, including any of a variety of chemically resilient and/or temperature resistant materials. The second outer layer 14 may be woven, non-woven or otherwise formed from various types of fibrous or non-fibrous materials. In some embodiments of the present invention, the second outer layer 14 is formed from a porous and substantially rigid UHMW polyethylene or like substantially rigid and porous material.

The porosity of the second outer layer 14 may be adjusted as desired to accommodate a variety of application requirements. The porosity of the second outer layer 14 may be uniform in all three axes, which can facilitate constant fluid flow in filtration and/or separation applications. Preferably, the pore size distribution of the second outer layer 14 is substantially consistent, with nominal values ranging from about 50.0 microns to about 2.5 microns. The second outer layer 14 may preferably be converted from hydrophobic to hydrophilic and vice versa. The second outer layer 14 may also be either oleophilic or oleophobic. Similarly, the second outer layer 14 may be treated to repel the passage therethrough of at least one of a solvent or a petroleum-based substance. The second outer layer 14 preferably defines an open cell (tortuous path) structure with a void volume in the range of about 10% to about 65%. The second outer layer 14 preferably may be bonded to nearly any material, including, for example, polypropylene materials, polyethylene materials, polyester materials, Kevlar®, glass fabrics, and a variety of other materials. An example of an appropriate material for use as the second outer layer 14 is a microporous ultra high molecular weight (UHMW) polyethylene. UHMW polyethylene has a tensile strength in the range of about 1000 to about 4000 psi.

In one embodiment of the present invention, the porosity of the UHMW polyethylene is within the range of about 10% to about 70% open area. In another embodiment of the present invention, the porosity of the UHMW polyethylene is within the range of about 25% to about 45% open area. In one embodiment of the present invention, the UHMW polyethylene layer is about 7 mils thick. In another embodiment of the present invention, the UHMW polyethylene layer defines a thickness within the range of about 3 mils to about 100 mils; and in another embodiment of the present invention, the UHMW polyethylene defines a thickness within the range of about 3 mils to about 50 mils. Typically, the thicker the layer of UHMW polyethylene or like porous, substantially incompressible layer (or the overall thickness of such layers for venting liners that include multiple UHMW polyethylene and/or other porous, substantially incompressible layers), the greater is the venting capacity of the venting liner (or the higher is the flow rate of gases through the venting liner during venting). For example, a liner including an approximately 7 mil thick UHMW polyethylene or like porous, substantially incompressible layer will vent the same volume of gas more quickly (substantially all other factors being equal) than a like venting liner including an approximately 5 mil thick UHMW polyethylene or like porous, substantially incompressible layer. In addition, typically the greater the porosity of the UHMW polyethylene or like porous, substantially incompressible layer(s), the greater will be the flow rate of gases that pass through the venting liner when venting. For example, a venting liner including an approximately 5 mil thick UHMW polyethylene or like porous, substantially incompressible layer defining a 50% porosity level (i.e., 50% open area by volume) will vent the same volume of gas more quickly (substantially all other factors being equal) than a like venting liner including an approximately 5 mil thick UHMW polyethylene or like porous, substantially incompressible layer defining a 25% porosity level (i.e., 25% open area by volume).

Figure 6A:
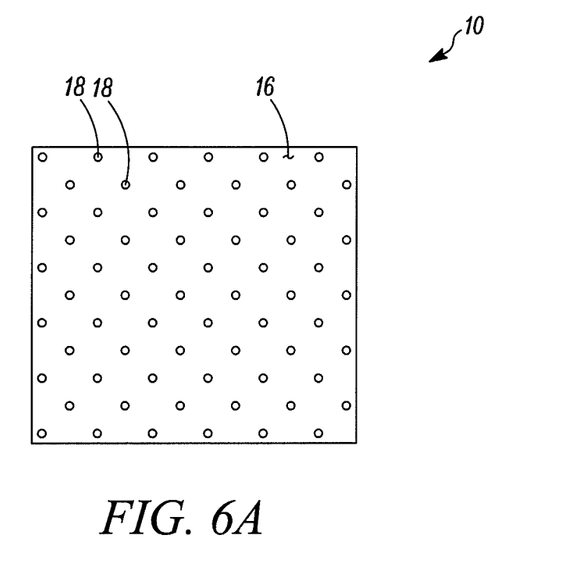
FIG. 6A is a somewhat schematic, top plan view of a portion of a venting liner of the present invention illustrating an exemplary fluid-flow aperture pattern formed in the inner layer of the liner.
Figure 6B:
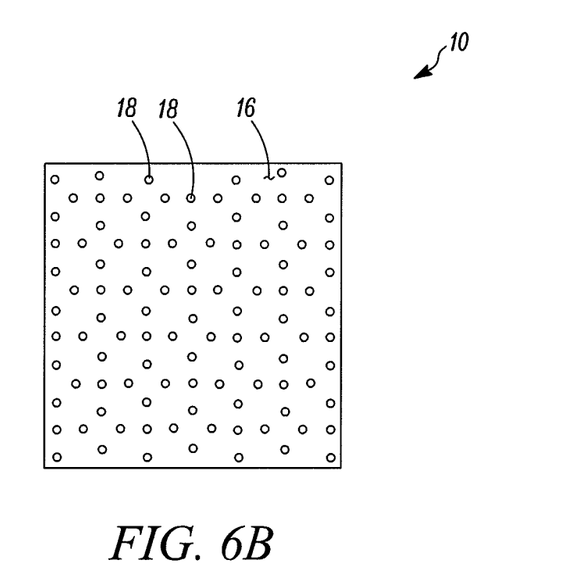
FIG. 6B is a somewhat schematic, top plan view of a portion of a venting liner of the present invention illustrating an exemplary fluid-flow aperture pattern formed in the inner layer of the liner.

As may be recognized by those of ordinary skill in the pertinent art based on the teachings herein, the venting liner 10 may include one or more additional layers to address the requirements or performance objectives of any of a variety of applications that are currently known, or that later become known. For example, the venting liner may include plural inner layers, plural outer layers, and/or intervening layers between the inner and outer layers. For example, the liner may include plural layers and/or other features as disclosed in U.S. Patent Application 61/027,253, entitled "Venting Liner and Method," and co-pending U.S. Patent Application Publication No. 2005/0248097, now U.S. Pat. No. 7,461,754, entitled "Gasket For Horizontal Venting And Related Method", both of which are assigned to the Assignee of the present invention and are hereby expressly incorporated by reference in their entireties as part of the present disclosure. In addition, the layers may be laminated or otherwise fixedly secured to one another in any of numerous different ways that are currently known or that later become known to those of ordinary skill in the pertinent art, including without limitation laminating processes that apply heat and pressure, such as by calendaring the layers or by autoclaving the layers, and/or any of such processes that apply adhesives, bonding agents, and/or surface treatments to facilitate fixedly securing contiguous layers to each other. Likewise, any of the layers may be treated by any way known or that becomes known to alter the chemical or physical properties of the layers, such as for color or to alter the chemical reactivity of the layers Referring to FIGS. 6A and 6B, the fluid-flow apertures 18 of the inner layer 16 may be formed in any of a variety of patterns that are currently known or that later become known. As shown in FIG. 6A, the fluid-flow apertures 18 may be formed in rows wherein the apertures are substantially equally spaced relative to each other. As shown in FIG. 6B, the fluid-flow apertures 18 alternatively may be formed in a more random pattern as compared to the pattern of FIG. 6B. In other embodiments of the present invention, the fluid-flow aperture pattern may be more heavily distributed in one portion of the inner layer 16 as opposed to other portions of the layer to direct the gas flow in a particular manner. Likewise, the size(s) of the fluid-flow apertures 18 may be varied or otherwise adjusted to direct gas flow in a particular manner and/or to otherwise control the characteristics of the gas flow through the liner.

Figure 4:
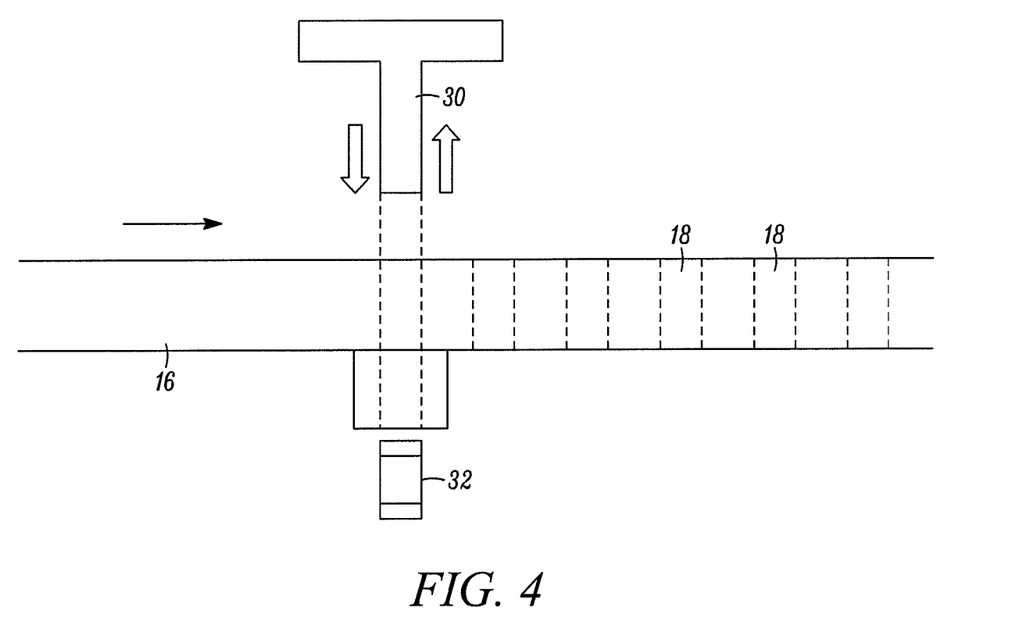
FIG. 4 is a side elevational, partial cross-sectional view of the inner layer of the venting liner of FIG. 1, illustrating an exemplary method of perforating the inner layer.

Turning to FIG. 4, an exemplary apparatus for perforating the inner layer 16 includes a plurality of perforating members shown typically at 30. Each perforating member 30 defines a blade on its distal end that is driven into engagement with the inner layer 16 to perforate the inner layer. In the illustrated embodiment, each perforating member 30 cuts a respective substantially cylindrical piece of material 32 out of the inner layer 16 to form the resulting fluid flow aperture 18. Preferably, a plurality of perforating members 30 are mounted on a support surface (not shown) that is driven into and out of engagement with the inner layer to cut the fluid-flow apertures 18 therethrough. In some such embodiments, the perforating members 30 are mounted on the support surface relative to each other to define a respective aperture pattern, such as either of the aperture patterns of FIGS. 6A and 6B. In the illustrated embodiment, each perforating member 30 and resulting fluid-flow aperture 18 is substantially circular in shape; however, the inner layer material is resilient, and thus the material forming each aperture may close or substantially close on itself, while nevertheless allowing the flow of air and/or other gas therethrough. Also in the illustrated embodiments, the perforation members forming the apertures each defines a diameter within the range of about 0.01 inch to about 0.1 inch, and preferably within the range of about 0.02 inch to about 0.08 inch; in one such embodiment, the perforation members define a diameter of about 0.05 inch; and adjacent apertures (or members forming the apertures) are laterally spaced relative to each other a distance within the range of about ¼ inch to about ¾ inch. In the illustrated embodiment, the perforation members 30 define substantially cylindrical shapes to form substantially cylindrical apertures; however, as may be recognized by those of ordinary skill in the pertinent art based on the teachings herein, the perforation members may take any of numerous different shapes and/or configurations that are currently known, or that later become known.

Figure 5:
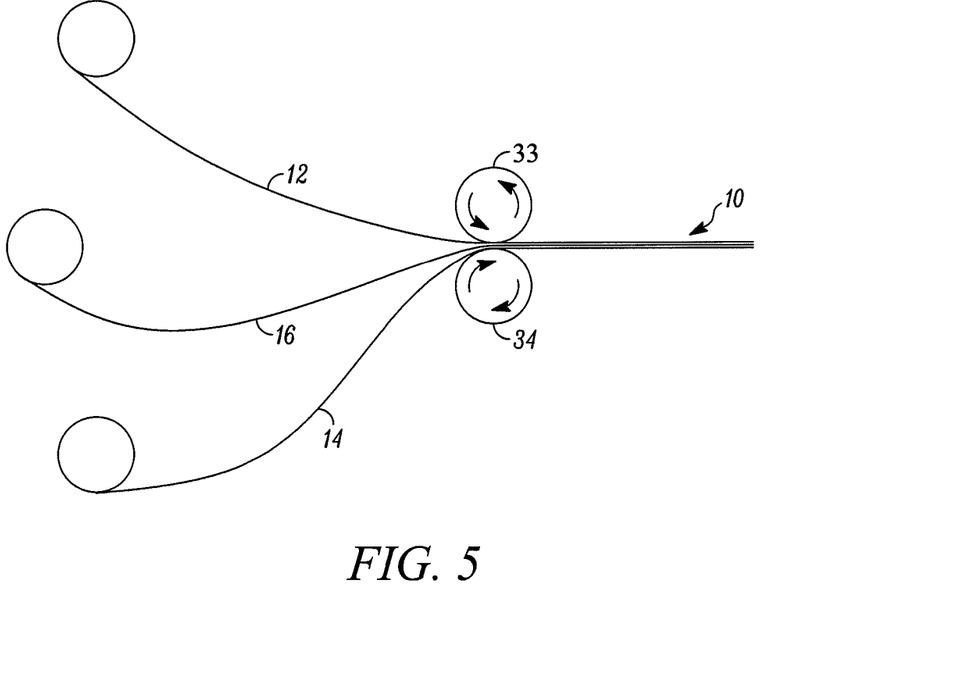
FIG. 5 is a somewhat schematic, side elevational, partial cross-sectional view of an exemplary apparatus for laminating the layers of the venting liner, including opposing heating rollers for engaging the layers within the gap between the rollers and applying heat and pressure to laminate the layers.

As shown in FIG. 5, in one embodiment of the present invention, the apparatus for forming the venting liner 10 includes a first support surface 33, which in the illustrated embodiment is a rotatably driven heated roller. The heated roller 33 is rotatably mounted over a second support surface 34 which in the illustrated embodiment is defined by a heated support roller. As can be seen, the layers 12, 14 and 16 are driven through the space formed between the opposing rollers 33, 34, and the rollers apply heat and pressure to the layers to laminate them together to form the material of the venting liner 10 in roll form. As may be recognized by those of ordinary skill in the pertinent art based on the teachings herein, the support surfaces 33 and 34 may take any of numerous different configurations that are currently known, or that later become known. For example, one or both of the support surfaces may be driven into engagement with the layers, and/or one or both of the support surfaces may be flat.

After the inner layer 16 is perforated, the first outer layer 12 is laminated to the inner surface 15 of the inner layer 16, and the second outer layer 14 is laminated to the outer surface 17 of the inner layer 16, such as by the application of heat and/or pressure as described above, to form a laminated sheet of the inner and outer layers. The liners 10 are then die cut or otherwise formed from the laminated sheet in a manner known to those of ordinary skill in the pertinent art.

As may be recognized by those of ordinary skill in the pertinent art based on the teachings herein, numerous changes and modifications may be made to the above-described and other embodiments of the present invention without departing from its scope as defined in the appended claims. For example, the inner and outer layers may be made of any of numerous different materials that are currently known or that later become known, the dimensions and/or configurations of the layers, of the pores and/or of the fluid-flow apertures, may take any of numerous different dimensions and/or configurations that are currently known or that later become known. The liners likewise may include any desired number of layers to impart any of numerous different physical properties, chemical properties, and/or characteristics for addressing any of numerous different applications or other requirements or otherwise as desired. In addition, the liners may be used to vent any of a variety of different devices, such as any of a variety of different containers, batteries, or other devices that require a liquid to be sealed within the device and a gas to be vented out of the device. Accordingly, this detailed description of the currently preferred embodiments of the present invention is to be taken in an illustrative as opposed to a limiting sense.

What is claimed is:

1. A method for making a venting liner comprising:
    perforating a first compressible layer at a plurality of locations spaced relative to each other and, in turn, forming inner fluid flow paths through the first layer; and
    laminating the first layer between a second substantially liquid impermeable and gas permeable layer and a third substantially incompressible layer and, in turn, forming a venting liner that vents gas through the second layer, through the inner fluid flow paths of the first layer, and through the third layer.

2. A method as defined in claim 1, wherein the first compressible layer is a foam layer.

3. A method as defined in claim 2, wherein the foam layer includes a plurality of layers.

4. A method as defined in claim 3, wherein die foam layer includes an inner foam layer and opposing outer substantially solid layers.

5. A method as defined in claim 4, wherein the inner foam layer is a low density polyethylene foam and the opposing outer substantially solid layers are substantially solid low density polyethylene layers.

6. A method as defined in claim 1, wherein the third substantially incompressible layer is UHMW polyethylene.

7. A method as defined in claim 1, wherein the laminating step comprises the application of one or more of heat or pressure.

8. A method as defined in claim 7, wherein the laminating step comprises moving the second layer, the third layer and the first layer between a first rotatably mounted roller and a second rotatably mounted roller spaced therefrom.

9. A method as defined in claim 1, wherein the first compressible layer is configured to vent gas vertically therethrough.

10. A method as defined claim 1, wherein the third substantially incompressible layer is configured to vent gas horizontally therethrough.

11. A method as defined in claim 10, wherein the third substantially incompressible layer is further configured to vent gas vertically therethrough.

12. A method as defined in claim 1, wherein the perforating step comprises forming a plurality of fluid flow apertures through the first compressible layer.

13. A method as defined in claim 12, wherein the perforating step comprises engaging and disengaging perforating members with the first compressible layer to cut the fluid flow apertures through the first compressible layer.

14. A method as defined in claim 13, wherein the perforating members define a diameter of from about 0.01 inch to about 0.1 inch.

15. A method as defined in claim 13, wherein the perforation members define substantially cylindrical shapes and the perforating step includes forming substantially cylindrical apertures.

16. A method as defined in claim 12, wherein said plurality of fluid flow apertures are unevenly or randomly distributed in the first compressible layer.

17. A method as defined in claim 12, wherein said plurality of fluid flow apertures are spaced substantially equidistant relative to one another.

18. A method as defined in claim 1, further comprising connecting the venting liner in fluid communication between a device and a closure; substantially preventing flow of liquid through the substantially liquid impermeable and gas permeable second layer, and allowing flow of gas from an interior of the device, through an interior of the second layer, into at least a plurality of the fluid-flow apertures of the first compressible layer, through an interior of the third substantially incompressible layer, and into ambient atmosphere.

19. A method for making a venting liner comprising:
    perforating a first compressible foam layer at a plurality of locations spaced relative to each other and, in turn, forming inner fluid flow paths through the first compressible foam layer; and
    laminating the first compressible foam layer between a second substantially liquid impermeable and gas permeable layer and a third substantially incompressible layer and, in turn, forming a venting liner that vents gas through the second layer, through the inner fluid flow paths of the first compressible foam layer, and through the third layer,
    wherein second the substantially liquid impermeable and gas permeable layer comprises polytetrafluoroethylene or expanded polytetrafluoroethylene, and wherein the third substantially incompressible layer comprises UHMW polyethylene, and
    wherein the second substantially liquid impermeable and gas permeable layer and the third substantially incompressible layer are free of perforations.

* * * * *